United States Patent
Rahman et al.

(10) Patent No.: US 10,356,730 B2
(45) Date of Patent: Jul. 16, 2019

(54) DERIVING PCMAX IN DUAL CONNECTIVITY

(71) Applicant: Telefonaktiebolaget LM Ericsson (publ), Stockholm (SE)

(72) Inventors: Imadur Rahman, Sollentuna (SE); Christian Bergljung, Lund (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 12 days.

(21) Appl. No.: 15/107,753

(22) PCT Filed: Sep. 28, 2015

(86) PCT No.: PCT/SE2015/051014
§ 371 (c)(1),
(2) Date: Jun. 23, 2016

(87) PCT Pub. No.: WO2016/053163
PCT Pub. Date: Apr. 7, 2016

(65) Prior Publication Data
US 2016/0323834 A1 Nov. 3, 2016

Related U.S. Application Data

(60) Provisional application No. 62/056,909, filed on Sep. 29, 2014.

(51) Int. Cl.
| | | |
|---|---|---|
| *H04W 52/36* | (2009.01) | |
| *H04W 52/14* | (2009.01) | |
| *H04W 52/34* | (2009.01) | |
| *H04J 11/00* | (2006.01) | |
| *H04W 56/00* | (2009.01) | |

(52) U.S. Cl.
CPC ......... *H04W 52/36* (2013.01); *H04J 11/0083* (2013.01); *H04W 52/146* (2013.01);
(Continued)

(58) Field of Classification Search
CPC ..... H04W 52/34; H04W 52/30; H04W 52/36; H04W 52/146
(Continued)

(56) References Cited

U.S. PATENT DOCUMENTS

| | | |
|---|---|---|
| 2005/0013242 A1 | 1/2005 | Chen et al. |
| 2012/0195190 A1 | 8/2012 | Singh et al. |

(Continued)

FOREIGN PATENT DOCUMENTS

| | | |
|---|---|---|
| CN | 102204190 A | 9/2011 |
| EP | 1777893 A1 | 4/2007 |

(Continued)

OTHER PUBLICATIONS

PCT/US2015/013616 Pro of U.S. Appl. No. 62/033,993.*
(Continued)

*Primary Examiner* — John J Lee
(74) *Attorney, Agent, or Firm* — Murphy, Bilak & Homiller, PLLC

(57) ABSTRACT

There is disclosed a method for operating a terminal (10) in a wireless communication network, the terminal (10) being adapted for dual connectivity, the method comprising determining a total configured maximum output power $P_{CMAX}$ of the terminal (10) based on a synchronization level. There are also disclosed further related devices and methods.

13 Claims, 10 Drawing Sheets

(52) U.S. Cl.
CPC ......... *H04W 52/34* (2013.01); *H04W 52/367* (2013.01); *H04W 56/0005* (2013.01); *H04J 2011/0096* (2013.01)

(58) Field of Classification Search
USPC .......... 455/522, 69, 502, 67.11, 452.1, 552.1
See application file for complete search history.

(56) References Cited

U.S. PATENT DOCUMENTS

| 2013/0157571 A1* | 6/2013 | Wondka | ............ | H04W 52/0245 |
| | | | | 455/41.2 |
| 2017/0013565 A1* | 1/2017 | Pelletier | .............. | H04W 52/146 |

FOREIGN PATENT DOCUMENTS

| RU | 2360377 C2 | 6/2009 |
| RU | 2010126198 A | 1/2012 |
| WO | 2006024225 A1 | 3/2006 |

OTHER PUBLICATIONS

3GPP, "3rd Generation Partnership Project; Technical Specification Group Radio Access Network; Evolved Universal Terrestrial Radio Access (E-UTRA); User Equipment (UE) radio transmission and reception (Release 12)", 3GPP TS 36.101 V12.4.0, Jun. 2014, 1-531.

3GPP, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.5.0, Sep. 2014, 1-877.

Unknown, Author, "Pcmax definition for Dual Connectivity", TSG-RAN WG4 meeting #72, R4-144229, Interdigital, Dresden, Germany, Aug. 1-22, 2014, 1-4.

Unknown, Author, "Pcrnax definition principles for Dual Connectivity", TSG-RAN WG4 meeting #71, R4-143376, Interdigital, Seoul, Korea, May 19-23, 2014, 1-6.

Lang, J.P et al., "RSVP-TE Extensions in Support of End-to-End Generalized Multi-Protocol Label Switching (GMPLS) Recovery", IETF Network Working Group, Request for Comments 4872, May 2007, 1-48.

Lang, Jonathan P. et al, "Generalized Multi-Protocol Label Switching (GMPLS) Recovery Functional Specification", IETF Network Working Group, draft-ietf-ccamp-gmpls-recovery-functional-04.txt, Apr. 2005, 1-42.

Unknown, Author, "Remaining power control issues in dual connectivity", Nokia Networks, Nokia Corporation, 3GPP TSG-RAN WG1 Meeting #78bis, R1-144170, Ljubljana, Slovenia, Oct. 6-10, 2014, 1-4.

* cited by examiner

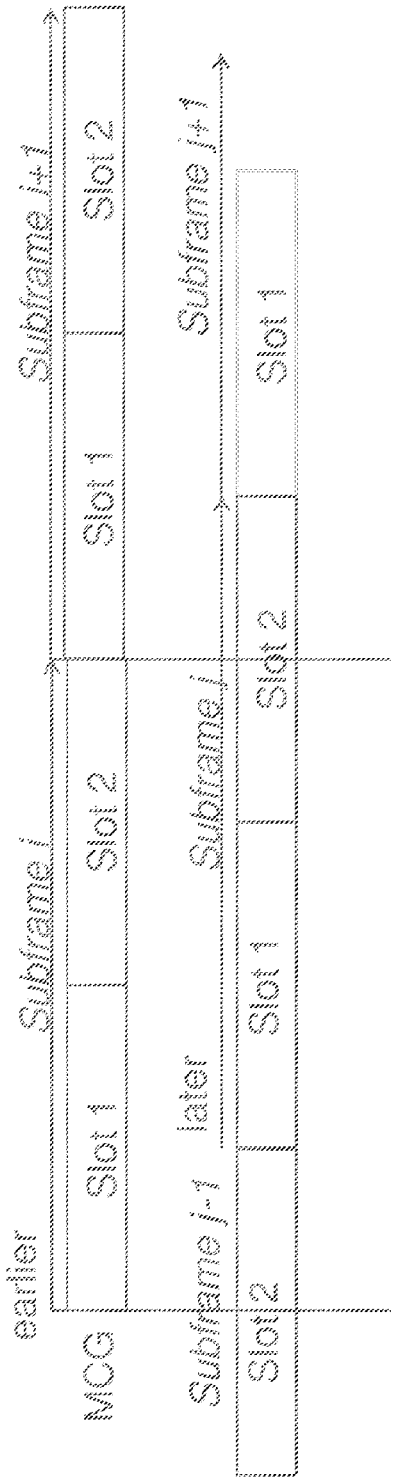
Fig. 3(a) Subframe timing mismatch between $i^{th}$ and $j^{th}$ subframe by less than 500μs

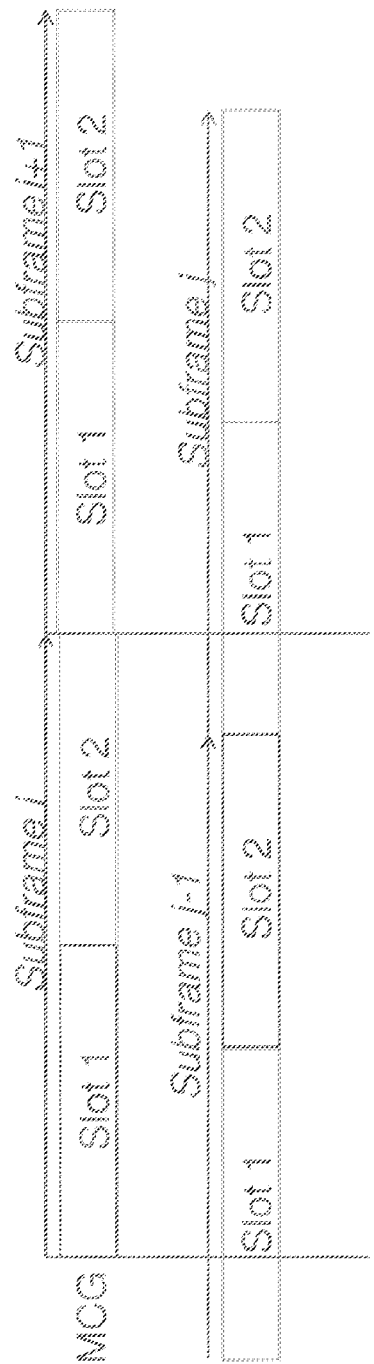
Fig. 3(b) Subframe timing mismatch between $i^{th}$ and $j^{th}$ subframe by more than 500μs

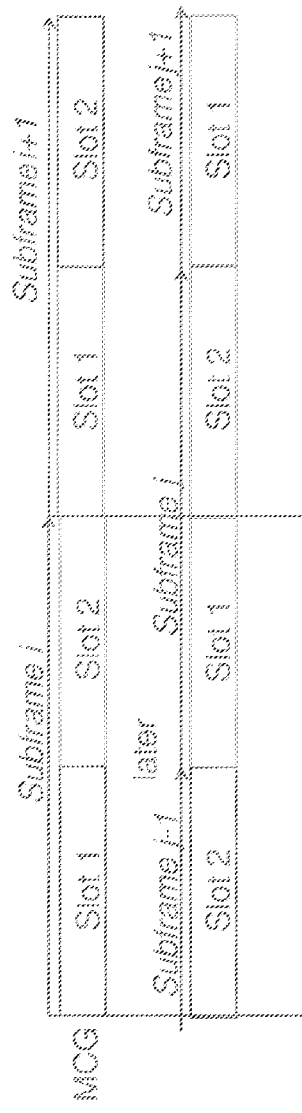
Fig. 3(c) Subframe timing mismatch between $i^{th}$ and $j^{th}$ subframe by exactly by one slot (i.e. 500μs)

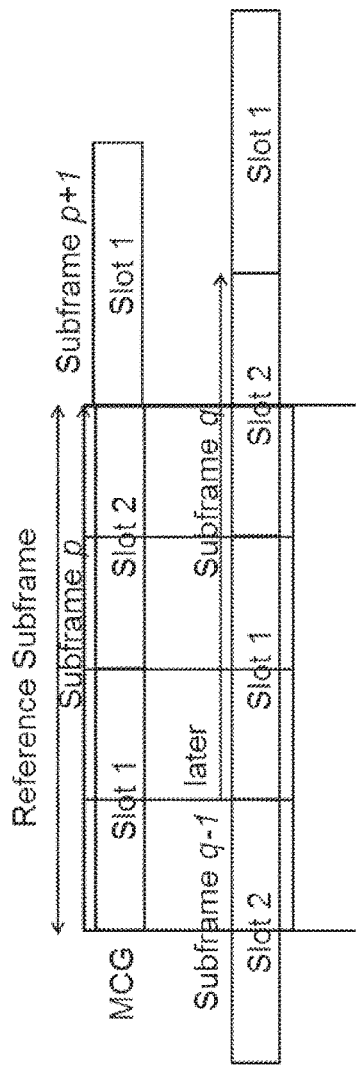
Fig. 4(a) When MCG leads
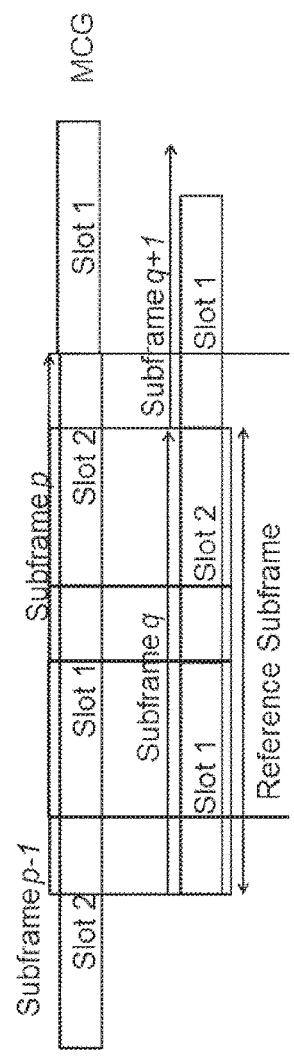
Fig. 4(b) When SCG leads

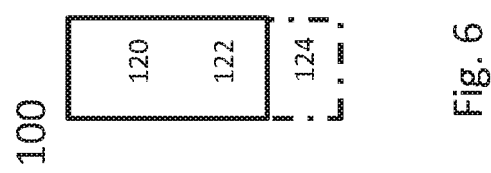

DERIVING PCMAX IN DUAL CONNECTIVITY

TECHNICAL FIELD

The present disclosure pertains to wireless communication technology, in particular in the context of dual connectivity.

BACKGROUND

In dual connectivity (DC) the UE (which may also be called terminal) can be served by two or more network nodes that may be called main/master eNB (MeNB) and secondary eNB (SeNB), or primary and secondary, or anchor and booster, and which may be seen as providing a "leg" of the dual connectivity each. The UE may be configured with a PCC (primary component carrier) or primary cell (PCell) from both MeNB and SeNB. The PCells from the MeNB and SeNB are called PCell and PSCell (primary secondary cell), respectively. The PCell and PSCell typically operate the terminal or UE independent from each other. The terminal or UE may be also configured with one or more SCCs (secondary component carrier; secondary cells of a carrier aggregate associated to a primary cell like the PCell or PSCell) from each of MeNB and SeNB. The corresponding secondary serving cells served by MeNB and SeNB may be called SCells. The terminal or UE in DC typically has separate TX/RX (transmitter/receiver) for each of the connections with MeNB and SeNB, respectively for an associated master cell group and secondary cell group. This allows the MeNB and SeNB to independently configure/control/schedule resources for the terminal or UE with one or more procedures e.g. radio link monitoring (RLM), DRX cycle, etc. on their respective PCell and PSCell.

As in single connectivity states, the terminal may be subject to limitations (e.g., regulatory and/or standard-defined limitations) pertaining to its transmission power over the cells (cell group) or carriers (carrier group) associated to each leg of the dual connectivity.

SUMMARY

It is an object of this disclosure to provide approaches allowing determination of a transmission power of a terminal in dual connectivity.

BRIEF DESCRIPTION OF THE DRAWINGS

The drawings are provided for illustrative purposes, and are not intended to limit the approaches to the embodiments shown. In the drawings.

FIGS. 3(a)-(c) show different levels of subframe liming mismatch between subframes in MCG and SCG, respectively;

FIGS. 4(a) and (b) show examples of subframe pairing;

FIG. 6 shows an exemplary network node;

DETAILED DESCRIPTION

In the following UE or user equipment may be used interchangeably for terminal; eNodeB may be used interchangeably for network node; and vice versa. Subclauses referred to pertain to related 3GPP/LTE specifications.

Figure 1:
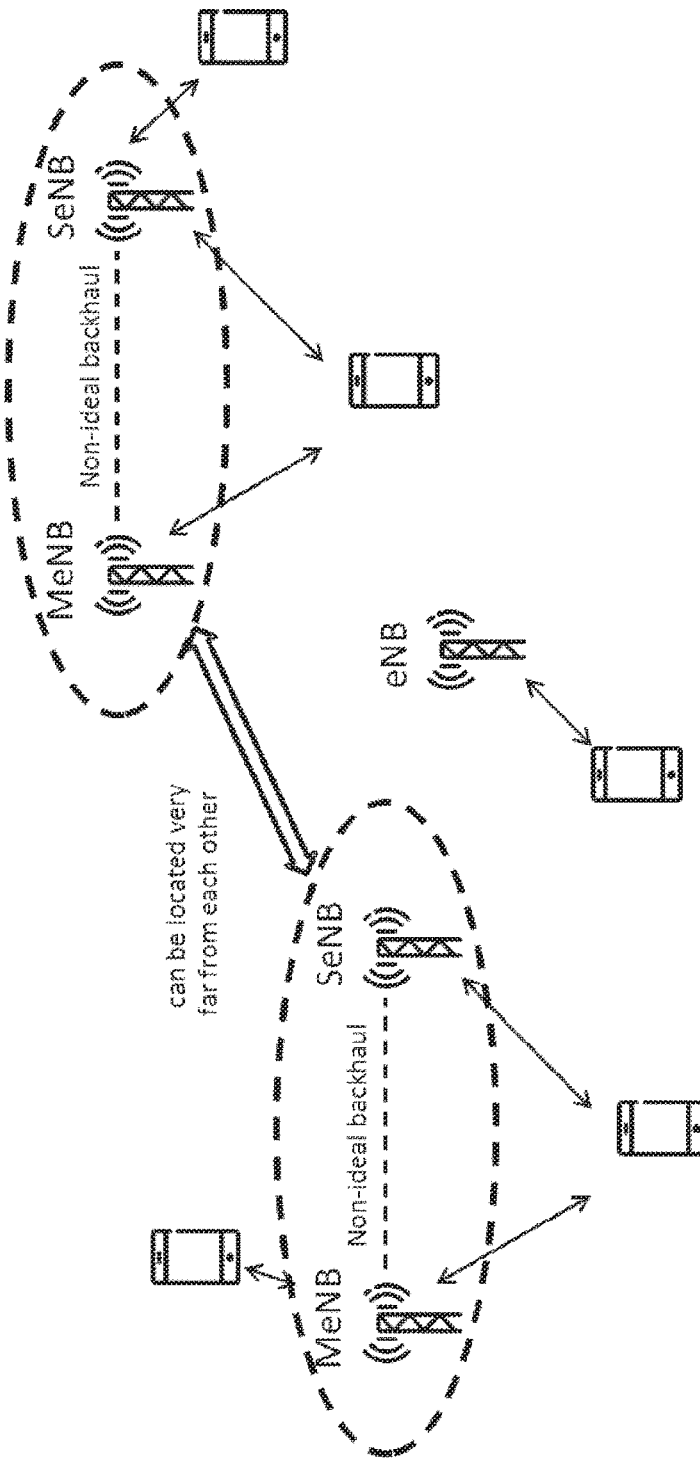
FIG. 1 shows a dual connectivity deployment scenario.

FIG. 1 shows a dual connectivity deployment scenario.

More specifically dual connectivity (DC) is a mode of operation of a terminal or UE, in particular in RRC_CONNECTED state, wherein the terminal or UE is configured with a Master Cell Group (MCG) and a Secondary Cell Group (SCG). A Cell Group (CG) is a group of serving cells associated with either the MeNB or the SeNB. The MCG and SCG are defined as follows:

Main Cell Group (MCG) is a group of serving cells associated with the MeNB, comprising of the PCell and optionally one or more SCells.

Secondary Cell Group (SCG) is a group of serving cells associated with the SeNB comprising of pSCell (Primary Scell) and optionally one or more SCells Two kinds of operation modes may be considered, with the first being implemented in 3GPP EUTRA Rel.12 and the other in a later release of the standard:

Synchronized operation: Downlink timing for MeNB and SeNB is synchronized down to about half an OFDM symbol (about ±33 µs). This means the terminal or UE supporting synchronized DC operation should be capable of receiving signals from MCG and SCG within ±33 µs. More specifically, in synchronized DC operation the time difference ($\Delta\tau$) between signals received at the UE from MeNB (i.e. from serving cells in MCG) and SeNB (i.e. from serving cells in SCG) should be within a first limit ($\Gamma 1$) or a first threshold (e.g. within ±33 µs).

Unsynchronized operation: Downlink timing for MeNB and SeNB is synchronized down to half a subframe (±500 µs). This means the UE supporting unsynchronized DC operation should be capable of receiving signals from MCG and SCG within ±500 µs. More specifically in unsynchronized DC operation, '$\Delta\tau$' should be within a second limit ($\Gamma 2$) or a second threshold (e.g. within ±500 µs), wherein $|\Gamma 2|>|\Gamma 1|$. In some exemplary embodiments, the DC operation may be considered to be unsynchronized provided that '$\Delta\tau$' is outside $\Gamma 1$. Also in some exemplary embodiments, the DC operation may be considered to be unsynchronized if the '$\Delta\tau$' is allowed to have any arbitrary value.

Figure 2:
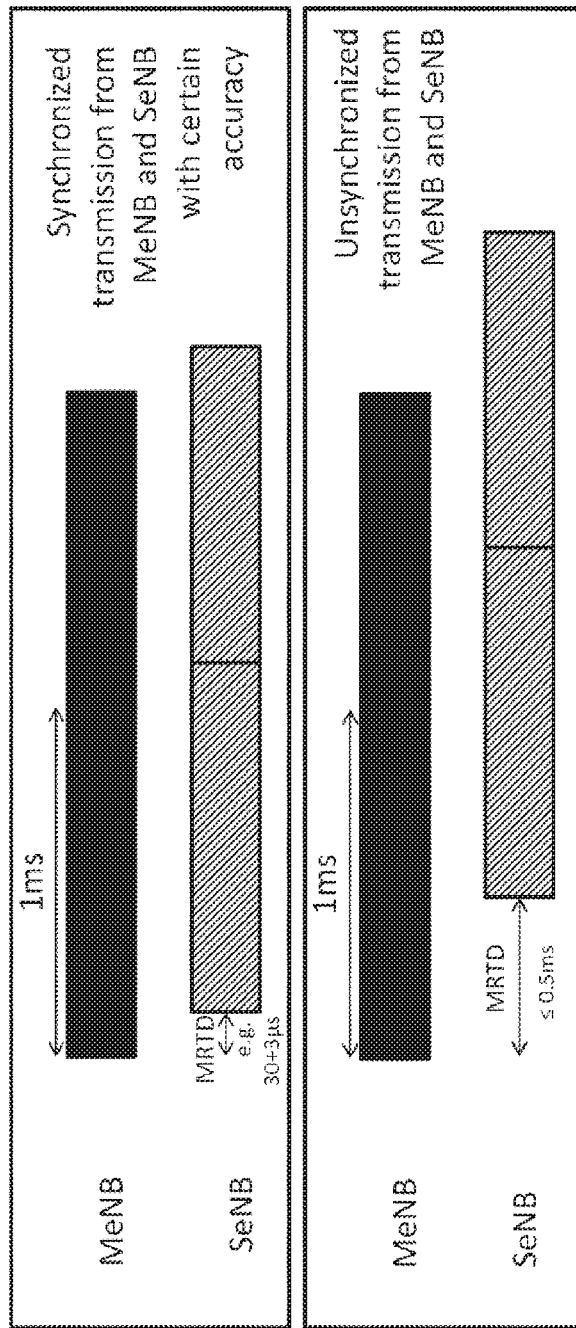
FIG. 2 shows examples of maximum reception timing differences in synchronized and unsynchronized mode of dual connectivity.

FIG. 2 shows maximum reception timing differences in synchronized and unsynchronized mode of dual connectivity Uplink power control is discussed in the following. Uplink power control plays an important role in radio resource management which has been adopted in most modern communication systems. It balances the needs to maintain the link quality against the needs to minimize interference to other users of the system and to maximize the battery life of the terminal.

In LTE, the aim of power control is to determine the average power over a SC-FDMA symbol and it is applied for both common channel and dedicated channel (PUCCH/PUSCH/SRS). A combined open-loop and closed-loop power control may be defined as:

Open loop power control: The terminal or UE calculates basic open-loop set-point based on the path-loss estimate and eNodeB controlled semi-static base level ($P_0$) comprising a nominal power level common for all UEs or terminals in the cell and a terminal or UE-specific offset;

Closed-loop power control: the network node or eNodeB updates the dynamic adjustment relative to set-point; terminal or UE adjusts the transmit power based on commands, e.g. upon TPC (transmit power control) commands, transmitted by the network node/eNodeB. It is also possible to connect the power control to modulation and coding scheme used for the uplink transmission.

$$P_{UE} = \min \left\{ P_{CMAX}, \underbrace{P_1 + \alpha \cdot PL}_{\text{open-loop set-point}} + \underbrace{f(i)}_{\text{closed-loop adjustment}} + \underbrace{\Delta_{TF}(i)}_{\text{MCS offset}} + \underbrace{10\log_{10}M}_{\text{bandwidth factor}} \right\} \quad (1)$$

Herein, $P_O$ represent a control value for an open-loop part, $\alpha$ is a parameter between 0 and 1 and PL represents a pathloss correction. Uplink power control for PUSCH and PUCCH is discussed in the following. Uplink power control is used both on the PUSCH and on PUCCH. The purpose is to ensure that the UE or terminal or mobile terminal transmits with sufficiently high but not too high power, since the latter would increase the interference to other users in the network as well as drain the battery of the terminal. In both cases, a parameterized open loop combined with a closed loop mechanism may generally be used. Roughly, the open loop part is used to set a point of operation, around which the closed loop component operates. Different parameters (targets and 'partial compensation factors') for user and control plane may be used.

In more detail, for PUSCH, the terminal sets the output power according to $$P_{PUSCHc}(i) = \min\{P_{MAXc}, 10 \log_{10}(M_{PUSCHc}(i)) + P_{O\_PUSCHc}(j) + \alpha_c \cdot PL_c + \Delta_{TFc}(i) + f_c(i)\} \text{ [dBm]},$$

wherein $P_{MAXc}$ is the maximum transmit power for the mobile terminal, $M_{PUSCHc}(i)$ is the number resource blocks assigned, $P_{O\_PUSCHc}(j)$ and $\alpha_c$ control the target received power, $PL_c$ is the estimated pathloss, $\Delta_{TFc}(i)$ is transport format compensator and $f_c(i)$ is the a UE specific offset or 'closed loop correction' (the function $f_c$ may represent either absolute or accumulative offsets). The index c numbers the component carrier and is of relevance for Carrier Aggregation cases.

The closed loop power control can be operated in two different modes, either accumulated or absolute. Both modes are based on TPC (Transmit Power Control), which may be represented by a command which is part of the downlink control signaling. When absolute power control is used, the closed loop correction function is reset every time a new power control command is received. When accumulated power control is used, the power control command is a delta correction with regard to the previously accumulated closed loop correction.

The accumulated power control command is defined as $$f_c(i) = f_c(i-1) + \delta_{PUSCHc}(i-K_{PUSCH}),$$

where $\delta_{PUSCHc}$ represents the TPC command received in $K_{PUSCH}$ subframe before the current subframe i and $f_c(i-1)$ is the accumulated power control value.

The absolute power control has no memory, so that $f_c(i) = \delta_{PUSCHc}(i-K_{PUSCH})$ may be assumed to hold.

The PUCCH power control has in principle the same configurable parameters with the exception that PUCCH only has full pathloss compensation, i.e. does only cover the case of $\alpha=1$.

The configured transmitted power $P_{CMAX}$ is described in the following. The configured transmitted power $P_{CMAX}$ may be defined as: The UE is allowed to set its configured maximum output power $P_{CMAX,c}$ for serving cell c. The configured maximum output power $P_{CMAX,c}$ is set within the following bounds:

$$P_{CMAX\_L,c} \leq P_{CMAX,c} \leq P_{CMAX\_H,c} \text{ with } P_{CMAX\_L,c} = \text{MIN}\{P_{EMAX,c} - \Delta T_{C,c}, P_{PowerClass} - \text{MAX}(MPR_c + A\text{-}MPR_c + \Delta T_{IB,c} + \Delta T_{C,c}, P\text{-}MPR_c)\}$$

$$P_{CMAX\_H,c} = \text{MIN}\{P_{EMAX,c}, P_{PowerClass}\}$$

where $P_{EMAX,c}$ is the value given by IE P-Max for a serving cell c;

$P_{PowerClass}$ is the maximum UE power specified in the standard, without taking into account the tolerance specified in the standard;

$MPR_c$ and $A\text{-}MPR_c$ for serving cell care specified in subclause 6.2.3 and subclause 6.2.4, respectively;

$\Delta T_{IB,c}$ is the additional tolerance for serving cell c as specified in Table 6.2.5-2; $\Delta T_{IB,c}=0$ dB otherwise;

$\Delta T_{C,c}=1.5$ dB when Note 2 in Table 6.2.2-1 applies;

$\Delta T_{C,c}=0$ dB when Note 2 in Table 6.2.2-1 does not apply.

$P\text{-}MPR_c$ is the allowed maximum output power reduction for a) ensuring compliance with applicable electromagnetic energy absorption requirements and addressing unwanted emissions/self desense requirements in case of simultaneous transmissions on multiple RAT(s) for scenarios not in scope of 3GPP RAN specifications;

b) ensuring compliance with applicable electromagnetic energy absorption requirements in case of proximity detection is used to address such requirements that require a lower maximum output power.

The UE shall apply P-MPR$_c$ for serving cell c only for the above cases. For UE conducted conformance testing P-MPR shall be 0 dB.

P-MPR$_c$ was introduced in the $P_{CMAX,c}$ equation such that the UE can report to the eNB the available maximum output transmit power. This information can be used by the eNB for scheduling decisions.

P-MPR$_c$ may impact the maximum uplink performance for the selected UL transmission path.

For each subframe, the $P_{CMAX\_L,c}$ for serving cell c is evaluated per slot and given by the minimum value taken over the transmission(s) within the slot; the minimum $P_{CMAX\_L,c}$ over the two slots is then applied for the entire subframe. $P_{PowerClass}$ shall not be exceeded by the UE during any period of time.

The measured configured maximum output power $P_{UMAX,c}$ shall be within the following bounds:

$$P_{CMAX\_L,c} - \text{MAX}\{T_L, T(P_{CMAX\_L,c})\} \leq P_{UMAX,c} \leq P_{CMAX\_H,c} + T(P_{CMAX\_H,c})$$

where $T(P_{CMAX,c})$ is defined by the tolerance table below and applies to $P_{CMAX\_L,c}$ and $P_{CMAX\_H,c}$ separately, while $T_L$ is the absolute value of the lower tolerance in Table 6.2.2-1 for the applicable operating band.

TABLE 6.2.5-1

| $P_{CMAX,c}$ tolerance | |
|---|---|
| $P_{CMAX, c}$ (dBm) | Tolerance T($P_{CMAX, c}$) (dB) |
| 23 < $P_{CMAX, c}$ ≤ 33 | 2.0 |
| 21 ≤ $P_{CMAX, c}$ ≤ 23 | 2.0 |
| 20 ≤ $P_{CMAX, c}$ < 21 | 2.5 |
| 19 ≤ $P_{CMAX, c}$ < 20 | 3.5 |
| 18 ≤ $P_{CMAX, c}$ < 19 | 4.0 |
| 13 ≤ $P_{CMAX, c}$ < 18 | 5.0 |
| 8 ≤ $P_{CMAX, c}$ < 13 | 6.0 |
| −40 ≤ $P_{CMAX, c}$ < 8 | 7.0 |

For the terminal or UE which supports inter-band carrier aggregation configurations with uplink assigned to one E-UTRA band the $\Delta T_{IB,c}$ is defined for applicable bands in Table 6.2.5-2.

The existing $P_{CMAX}$ definitions only cover the synchronized multiple carrier case i.e when two or more UL carriers are time synchronized or their transmit time difference is typically very small e.g. within CP length. However UL transmit time difference ($\Delta\mu$) between CCs in CA due to independent timing advanced commands (e.g. pTAG and sTAG) can become large. The maximum allowed UL time difference may be limited to about 32.5 µs as defined in section 7.9, TS 36.133 V12.5.0.

The UE in CA or in synchronized DC operation can still perform UL power control based on existing $P_{CMAX}$ parameter even if maximum UL time difference is up to 32.5 µs or in this order.

However in unsynchronized DC operation where the received time difference ($\Delta\tau$) is about ±500 µs, the UE may have to transmit signals on CCs belonging to SCG and MCG well outside the existing transmit timing window of 32.5 µs. For example, the magnitude of $\Delta\mu$ may be 500 µs or become even larger due to independent TA commands which the UE has to apply on UL CCs (i.e. TA1 to CCs in MCG and TA2 to CCs in SCG). The current power control requirements including the manner in which UE derives $P_{CMAX}$ on CCs is not suitable when the UL transmit timings of the CCs are shifted beyond 32.5 µs.

There are described methods for operating a wireless communication network and nodes and terminals for unsynchronized dual connectivity, including:

(1) Methods to define subframe pairs for dual connectivity calculations are defined (2) Methods to define $P_{CMAX}$ calculations on subframe basis and slot basis are defined (3) Methods to enhance the $P_{CMAX}$ definitions based on network guidance (4) Methods to adapt between first and second methods or schemes for deriving $P_{CMAX}$ depending on whether the UE is configured in unsynchronized or synchronized DC operations.

(5)

In one embodiment the method in a UE configured or being configured in DC comprises steps of:
Obtain information about the level of synchronization with which the UE is configured to operate in DC;
If the magnitude of the synchronization level is above a threshold (e.g. 200 µs) then determining which of one of the subframe or a time slot in a pair of at least partly overlapping subframes or slots belonging to different CG i.e. MCG and SCG, is leading in time;
Calculating or deriving the $P_{CMAX}$ for each CG based on at least the determined leading subframe or time slot;
Transmitting uplink signals in each CG based on the calculated or derived value of the $P_{CMAX}$ for each CG.

In another embodiment the method in a UE configured or being configured in DC comprises steps of:
Obtaining information about the level of synchronization with which the UE is configured to operate in DC;
Selecting between a first method and a second method for calculating or deriving the $P_{CMAX}$ based on the obtained level of synchronization information;
Calculating or deriving the $P_{CMAX}$ based on the selected method;
Transmitting uplink signals in each CG based on the calculated or derived value of the $P_{CMAX}$ for each CG.

In this specification, configured transmitted power for unsynchronized dual connectivity scheme is defined. Moreover, some enhancement of the $P_{CMAX}$ definition is also proposed.

The terminal or UE behavior with respect to $P_{CMAX}$ to be used for transmitting UL signals in each CG is well specified and consistent for all UEs.

The available UE output power can be used more efficiently.

In this section, there are mainly described systems with dual links (dual connectivity with one MCG and one SCG). In general, the solutions described in this disclosure may be easily applied to cases with multiple connectivity, e.g. with more than one secondary cell group.

The general term "network node" may be used, which may correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc.

The term terminal or user equipment (UE) may be used, which may refer to any type of wireless device communicating with a network node and/or with another terminal or UE in a cellular or mobile communication system. Examples of terminals or UEs are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles etc.

There are described methods for operating a terminal or UE to determine subframe pairs and reference subframe.

For dual connectivity, there may hold:
1. SFN alignment (synchronizing to a common timing/frequency reference) may not be possible between MCG and SCG and/or
2. there may be a significant or maximum receive timing difference between signals in subframe level from MeNB (as an example for a master network node) and SeNB (as an example for a secondary network node); e.g. a maximum of 500 µs; this may lead to signals received or transmitted by the terminal via the MCG associated to a master network node and signals received or transmitted by the terminal via a SCG associated to a secondary network node in dual connectivity being unsynchronized.

As shown in FIG. 3, there are mainly three possibilities of subframe boundary mismatch between received or transmitted signals from MCG and SCG at the UE due to difference in timing, namely:

(1) when the mismatch is less than the maximum of e.g. 500 μs (by extension, synchronized case is included here), (2) when the mismatch is more than the maximum of e.g. 500 μs (referring to the beginning of the subframes in temporal domain), and (3) when the mismatch is exactly on the maximum threshold of e.g. 500 μs (this is truly a theoretical case, with very little probability, in the order of 0.2%).

Due to these different possibilities of subframe boundary mismatch, the $P_{CMAX}$ needs to be derived by the UE for unsynchronized DC operation based on a rule and/or information received from at least one of the network nodes. The terminal or UE in unsynchronized DC operation will use the derived $P_{CMAX}$ value for transmitting in UL and/or for performing UL power control. These principles, which are elaborated in proceeding sections, may also apply in unsynchronized DC operation for any value of 'Δτ'. They may also be utilized generally for any kind of DC operation.

To define the $P_{CMAX}$ for dual connectivity, two subframes, one each of MCG and SCG, to be compared with each other may be identified.

FIG. 3 shows different levels of subframe timing mismatch between subframes in MCG and SCG respectively.

Based on the illustrations in FIG. 3, it could be challenging to find the subframe pairs that should be considered for $P_{CMAX}$ definition.

Generally, the subframe pairs may include two reference subframes (one each in MCG and SCG), which should be considered together for the purpose of defining the $P_{CMAX}$. In case of FIG. 4 (a), subframe i in MCG and subframe j in SCG constitute the subframe pair. Similarly, subframe i in MCG and subframe j−1 in SCG constitute the subframe pair in FIG. 4 (b). To constitute a subframe pair, a UE considers the subframes in MCG and SCG whose slot1 (i.e. first time slot in the subframe) overlap with each other. In this way, always the beginnings of the subframes are considered for constituting the subframe pair. Generally, there may be defined a pair of subframes to be compared, the pair comprising a subframe from and/or according to MCG and a subframe from and/or according to SCG. There may be chosen a slot 1 of one of the subframes of either the MCG or the SCG. As associated subframe of the pair the subframe of the other group (SCG or MCG, respectively) may be chosen, whose slot 1 overlaps with the chosen slot 1. The chosen slot 1 may be chosen from the cell group (MCG or SCG) leading in time. For the comparison, parts of the subframes overlapping with the chosen slot 1 may be considered.

Based on these discussions, the $P_{CMAX}$ may be derived based on the following main principles:

1. The subframes in one CG that overlap with subframes in another CG in their respective slot 1 should be paired together between CGs.

2. The leading CG is always taken as reference subframe i.e. whose subframe leads in time compared to the other subframe in the subframe pair. The reference subframe may be the subframe for which the calculated per terminal/UE $P_{CMAX}$ is applied by the terminal/UE. This is explained with an example below:

a. If subframe p and subframe q are the subframe pairs between MCG and SCG respectively, then I. if MCG leads, subframe p in MCG and subframes q−1 and q in SCG are considered for $P_{CMAX}$ definition i.e. for deriving the value of $P_{CMAX}$.

II. if SCG leads, subframes p and p−1 in MCG and subframe q in SCG are considered for $P_{CMAX}$ definition i.e. for deriving the value of $P_{CMAX}$.

Methods in the UE to define $P_{CMAX}$ by calculating on subframe basis are discussed in the following. For unsynchronized dual connectivity, the following subframes may be considered:

TABLE 1

| CG | MCG leads | SCG leads |
|---|---|---|
| MCG | p | p − 1, p |
| SCG | q − 1, q | q |
| Reference subframe | p | q |

Table 1 shows the subframe number in the subframe pair and the reference subframe for $P_{CMAX}$ definition or determination. It briefly summarizes the subframe pairs for the examples shown in FIGS. 4 (a) and (b). In the first case (i.e. MCG leads), $p^{th}$ subframe in MCG is the reference subframe, while in the second case (i.e. SCG leads), $q^{th}$ subframe in SCG is the reference subframe. The reference subframe is the subframe where the calculated per UE $P_{CMAX}$ is applied.

The total configured maximum output power $P_{CMAX}$ may be set within the following bounds:

$$P_{CMAX\_L} \leq P_{CMAX} \leq P_{CMAX\_H}$$

Where $$P_{CMAX\_L} = \begin{cases} \text{MIN} \begin{Bmatrix} P_{CMAX\_L,x}(p), \\ P_{CMAX\_L,y}(q-1), \\ P_{CMAX\_L,y}(q), \\ P_{PowereClass} \end{Bmatrix} & \text{when } MCG \text{ leads} \\ \text{MIN} \begin{Bmatrix} P_{CMAX\_L,x}(p-1), \\ P_{CMAX\_L,x}(p), \\ P_{CMAX\_L,y}(q), \\ P_{PowereClass} \end{Bmatrix} & \text{when } SCG \text{ leads} \end{cases}$$

$$P_{CMAX\_H} = \begin{cases} \text{MIN} \begin{Bmatrix} P_{CMAX\_H,x}(p), \\ P_{CMAX\_H,y}(q-1), \\ P_{CMAX\_H,y}(q), \\ P_{PowereClass} \end{Bmatrix} & \text{when } MCG \text{ leads} \\ \text{MIN} \begin{Bmatrix} P_{CMAX\_H,x}(p-1), \\ P_{CMAX\_H,x}(p), \\ P_{CMAX\_H,y}(q), \\ P_{PowereClass} \end{Bmatrix} & \text{when } SCG \text{ leads} \end{cases}$$

Here, the above mentioned $P_{CMAX}$ is applied to the reference subframes, i.e. to the $p^{th}$ and $q^{th}$ subframes when MCG leads and SCG leads respectively. $P_{CMAX\_L,a(b)}$ and $P_{CMAX\_H,a(b)}$ are the $P_{CMAX,c}$ lower and higher limit respectively for CG a on subframe b.

$P_{CMAX\_L,a(b)}$ is defined as:

$$P_{CMAX\_L,a}(b) = MIN\left\{10\log_{10}\sum_{c\in a} MIN\left[\frac{p_{EMAX,c\in a}}{\Delta t_{C,c\in a}}, \frac{P_{PowerClass}}{mpr_{c\in a}\cdot ampr_{c\in a}\Delta t_{C,c\in a}\cdot \Delta t_{IB,c\in a}}, \frac{P_{PowerClass}}{ampr_{c\in a}}\right], P_{PowerClass}\right\}$$

where $p_{EMAX,c\in a}$, $\Delta t_{C,c\in a}$, $\Delta t_{IB,c\in a}$ and the other parameters in the above equation are defined for serving cell c in CG a for subframe b.

Similarly, $P_{CMAX\_H,a(b)}$ is defined as:

$$P_{CMAX\_H,a}(b) = MIN\left\{10\log_{10}\sum_{c\in a} p_{EMAX,c\in a}, P_{PowerClass}\right\}$$

Once the $P_{CMAX}$ is defined, then the measured configured maximum output power, $P_{CMAX}$ can be defined per UE for the reference subframe.

Methods in the UE to define $P_{CMAX}$ by calculating on slot basis are described in the following. In a variant, the $P_{CMAX}$ calculations can be done on slot basis instead of subframe level. Therein, the principles described above for $P_{CMAX}$ calculation based on subframe level also applies for $P_{CMAX}$ calculation on slot basis. The calculated or derived $P_{CMAX}$ will be applied by the UE for UL transmission also on the reference subframe, which is the subframe containing the first slot of leading CG.

FIG. 3 shows examples for slot based calculations for $P_{CMAX}$.

As seen in FIG. 3, $P_{CMAX\_L}$ can be defined as:

$$P_{CMAX\_L} = \begin{cases} \begin{cases} MIN\begin{bmatrix} P_{CMAX\_L,x}(p,1), \\ P_{CMAX\_L,y}(q-1,2) \end{bmatrix}, \\ MIN\begin{bmatrix} P_{CMAX\_L,x}(p,1), \\ P_{CMAX\_L,y}(q,1) \end{bmatrix}, \\ MIN\begin{bmatrix} P_{CMAX\_L,x}(p,2), \\ P_{CMAX\_L,y}(q,1) \end{bmatrix}, \\ MIN\begin{bmatrix} P_{CMAX\_L,x}(p,2), \\ P_{CMAX\_L,y}(q,2) \end{bmatrix}, \\ P_{PowereClass} \end{cases} & \text{when } MCG \text{ leads} \\ \begin{cases} MIN\begin{bmatrix} P_{CMAX\_L,x}(p-1,2), \\ P_{CMAX\_L,y}(q,1) \end{bmatrix}, \\ MIN\begin{bmatrix} P_{CMAX\_L,x}(p,1), \\ P_{CMAX\_L,y}(q,1) \end{bmatrix}, \\ MIN\begin{bmatrix} P_{CMAX\_L,x}(p,1), \\ P_{CMAX\_L,y}(q,2) \end{bmatrix}, \\ MIN\begin{bmatrix} P_{CMAX\_L,x}(p,2), \\ P_{CMAX\_L,y}(q,2) \end{bmatrix}, \\ P_{PowereClass} \end{cases} & \text{when } SCG \text{ leads} \end{cases}$$

Similarly, $P_{CMAX\_H}$ can be defined as:

$$P_{CMAX\_H} = \begin{cases} \begin{cases} MIN\begin{bmatrix} P_{CMAX\_H,x}(p,1), \\ P_{CMAX\_H,y}(q-1,2) \end{bmatrix}, \\ MIN\begin{bmatrix} P_{CMAX\_H,x}(p,1), \\ P_{CMAX\_H,y}(q,1) \end{bmatrix}, \\ MIN\begin{bmatrix} P_{CMAX\_H,x}(p,2), \\ P_{CMAX\_H,y}(q,1) \end{bmatrix}, \\ MIN\begin{bmatrix} P_{CMAX\_H,x}(p,2), \\ P_{CMAX\_H,y}(q,2) \end{bmatrix}, \\ P_{PowereClass} \end{cases} & \text{when } MCG \text{ leads} \\ \begin{cases} MIN\begin{bmatrix} P_{CMAX\_H,x}(p-1,2), \\ P_{CMAX\_H,y}(q,1) \end{bmatrix}, \\ MIN\begin{bmatrix} P_{CMAX\_H,x}(p,1), \\ P_{CMAX\_H,y}(q,1) \end{bmatrix}, \\ MIN\begin{bmatrix} P_{CMAX\_H,x}(p,1), \\ P_{CMAX\_H,y}(q,2) \end{bmatrix}, \\ MIN\begin{bmatrix} P_{CMAX\_H,x}(p,2), \\ P_{CMAX\_H,y}(q,2) \end{bmatrix}, \\ P_{PowereClass} \end{cases} & \text{when } SCG \text{ leads} \end{cases}$$

In the both of the above equation, $P_{CMAX\_L,a(b,c)}$ and $P_{CMAX\_H,a(b,c)}$ denotes lower and higher $P_{CMAX}$ for CG a in subframe b and slot c.

Methods in the UE to enhance the $P_{CMAX}$ definitions are described in the following. In a Rel-12 LTE system, the MeNB provides guidance to UE regarding the ratio of $P_{CMAX}$ that should be assigned for transmitting signals to the MeNB and the remaining power for transmitting signals to the SeNB.

For example, a MeNB may configure the terminal or UE with one or more parameters via higher layer signaling to transmit power up to a certain limit in each CG such as U % and V % of total amount of UE transmit power for MCG and SCG respectively. Herein, U+V=100.

The UE is configured with the ratio of $P_{CMAX}$ in different CGs or similar parameters (e.g. U, V etc as stated above) for transmitting in MCG and SCG regardless of whether the UE operates in synchronized DC or unsynchronized DC scenarios.

In this case, the $P_{CMAX}$ in each CG is further calculated or derived or adapted by taking into account the ratio of $P_{CMAX}$ or similar parameters. The UE then transmits using the derived value of $P_{CMAX}$ in each CG.

The further adaptation of $P_{CMAX}$ in response to the obtained ratio of $P_{CMAX}$ in different CGs or similar parameters is carried out by the UE regardless of whether the UE is configured to operate in unsynchronized DC or synchronized DC operations. The further adaptation of the $P_{CMAX}$ is described below:

α may represent as the ratio for $P_{MeNB}$ and $P_{SeNB}$ (configured maximum transmitted power for MeNB and SeNB respectively; in particular for UL transmission by the terminal/UE), where $P_{MeNB} = \alpha P_{PowerClass}$ $P_{SeNB} = (1-\alpha) P_{PowerClass}$ and α can be of any value between 0 and 1 (corresponding to U and V as mentioned earlier). $P_{PowerClass}$ may generally refer to the power available/allowable for the terminal or UE of a given class as defined by the relevant standard. Denoting x=MeNB and y=SeNB, when MCG leads, the $P_{CMAX\_L,x}$ and $P_{CMAX\_L,y}$ may be defined as:

$$P_{CMAX\_L,x} = \text{MIN}\{P_{MeNB}, P_{CMAX\_L,x}(p), \Delta_1\}$$

$$P_{CMAX\_L,y} = \text{MIN}\{P_{SeNB}, P_{CMAX\_L,y}(q-1), P_{CMAX\_L,y}(q), \Delta_2\}$$

wherein $$\Delta_1 = \text{MIN}\{P_{CMAX\_L,y}(q-1), P_{CMAX\_L,y}(q)\} - P_{SeNB}$$

$$\Delta_2 = P_{CMAX\_L,x}(p) - P_{MeNB} \quad (5.4\text{-}1)$$

Similarly, when SCG leads, the $P_{CMAX\_L,x}$ and $P_{CMAX\_L,y}$ may be defined as:

$$P_{CMAX\_L,x} = \text{MIN}\{P_{MeNB}, P_{CMAX\_L,x}(p-1), P_{CMAX\_L,x}(p), \Delta_1\}$$

$$P_{CMAX\_L,y} = \text{MIN}\{P_{SeNB}, P_{CMAX\_L,y}(q), \Delta_2\}$$

wherein $$\Delta_1 = P_{CMAX\_L,y}(q) - P_{SeNB}$$

$$\Delta_2 = \text{MIN}\{P_{CMAX\_L,y}(p-1), P_{CMAX\_L,y}(p)\} - P_{MeNB} \quad (5.4\text{-}2)$$

In case of synchronized DC operation the UL subframes in both MCG and SCG don't lead with each and rather are time aligned or are within a certain limit e.g. 33 μs. In synchronized DC operation the $P_{CMAX}$ adaptation may be based on any one of the two rules (5.4-1 and 5.4-2) above.

A method in or for operating a UE of adapting a $P_{CMAX}$ calculation based on a level of synchronization is discussed in the following. A DC capable UE and/or a terminal adapted for DC may be configured by a network node (e.g. master network node) with different level of synchronizations. For example, a UE capable of operating in both unsynchronized DC or synchronized DC scenarios may be configured with or for either unsynchronized DC or synchronized DC operations by the network node. The network node may be adapted to configure a terminal, which may be adapted for DC and/or be in dual connectivity with a MCG and a SCG, with different levels of synchronizations.

In yet another embodiment, the terminal or UE adapts between a first method and a second method for calculating or deriving the $P_{CMAX}$ based on the synchronized level with which the UE is configured to operate in DC. For example the terminal or UE:

- may apply the first method for calculating or deriving the $P_{CMAX}$ when configured to operate in synchronized DC, wherein the first method is the existing method is described above for synchronized operation (i.e. section 6.2.5 of 3GPP TS 36.101) and
- may apply the second method for calculating or deriving the $P_{CMAX}$ when configured to operate in unsynchronized DC wherein the second method is the existing method is described in the preceding sections for unsynchronized operation, either subframe or slot-based).

Regardless of the level of synchronization, the terminal or UE may further adapt $P_{CMAX}$ in response to the obtained ratio of $P_{CMAX}$ in different CGs or similar parameters as described above. The UE then transmit in each CG using the derived values of $P_{CMAX}$ for each CG.

In order to apply the method disclosed in this embodiment, the terminal or UE configured or being configured in DC may perform the following minimum steps:

Obtains information about the level of synchronization with which the UE is configured to operate in DC, which synchronization level comprises the received time difference of signals from different CGs e.g. MCG and SCG (e.g. by an obtaining module of the terminal or UE);

Selecting between the first method and the second method for calculating or deriving the $P_{CMAX}$ based on the obtained information (e.g. by a selecting module of the terminal or UE);

calculating or deriving the $P_{CMAX}$ based on the selected method (e.g. by a calculating module of the terminal or UE); Selecting module and calculating module may be integrated to a determining module for determining $P_{CMAX}$. This may be considered as an implementation of a method for operating a terminal. There may be considered a terminal adapted to perform this method.

Alternatively or additionally, there may be considered a method for operating a terminal in a wireless communication network, the terminal being adapted for dual connectivity. The terminal may be connected to a master network node via a master cell group (MCG), and to a secondary network node via a secondary cell group (SCG). The method may comprise obtaining, by the terminal, of synchronization information, in particular information regarding the time difference between signals from the MCG and the SCG. The method may further comprise determining a $P_{CMAX}$ based on the synchronization information. Determining a $P_{CMAX}$ based on the synchronization information may comprise selecting a method to determine $P_{CMAX}$ depending on the synchronization level, in particular selecting between a first method and a second method as described herein. The second method may be slot-based or subframe based, as described herein. Optionally or additionally, determining $P_{CMAX}$ may comprise calculating $P_{CMAX}$ based on the selected method. The method may comprise UL transmitting based on the determined $P_{CMAX}$.

There may generally be considered a terminal adapted to perform any one or more than one of the methods for operating a terminal as disclosed herein.

Alternatively or additionally, there may be considered a terminal for a wireless communication network, the terminal being adapted for dual connectivity. The terminal may be adapted for, and/or comprise a connectivity module for, being connected or connectable to a master network node via a master cell group (MCG), and to a secondary network node via a secondary cell group (SCG). The terminal may be adapted for, and/or comprise an obtaining module for, obtaining synchronization information, in particular information regarding the time difference between signals from the MCG and the SCG.

It may be considered that the terminal is adapted for, and/or may comprise a determining module for, determining a $P_{CMAX}$ based on the synchronization information. Determining a $P_{CMAX}$ based on the synchronization information may comprise selecting a method to determine $P_{CMAX}$ depending on the synchronization level, in particular selecting between a first method and a second method as described herein, e.g. by a selecting module of the terminal. Optionally or additionally, determining $P_{CMAX}$ may comprise calculating $P_{CMAX}$ based on the selected method, e.g. by a calculating module.

The terminal may optionally be adapted for, and/or comprise a transmitting module for, UL transmitting based on the determined $P_{CMAX}$.

There may be considered a method of operating a network node, in particular a master network node and/or secondary network node. The network node may be in dual connectivity with a terminal. The method may comprise obtaining, by the network node, synchronization information regarding the time difference between signals from a MCG and a SCG a terminal is configured with. The method may additionally comprise transmitting the obtained synchronization information to the terminal.

There may be considered a network node for a wireless communication network, in particular a master network node and/or secondary network node. The network node may optionally be adapted for, and/or comprise a connectivity module for, dual connectivity with a terminal.

The network node may be adapted for, and/or comprise an obtaining module for, obtaining, by the network node, synchronization information regarding the time difference between signals from a MCG and a SCG a terminal is configured with. It may be considered that the network node further is adapted for, and/or comprises a transmitting module for, transmitting the obtained synchronization information to the terminal.

Generally, any terminal and/or network node described herein may comprise circuitry, in particular control circuitry and/or radio circuitry configured to carry out the respective methods described and/or to provide the described functionality.

Obtaining, by the terminal or UE and/or a network node, may comprise determining or obtaining synchronization information and/or information about the level of synchronization with which the UE is configured to operate in DC and/or the time difference between MCG signals and SCG signals autonomously (e.g. based on received time difference of signals from and/or transmitted via CGs), and/or receiving an indication received from the network, e.g. one of the network nodes, e.g. the master network node or the secondary network node.

Configured transmitted power for dual connectivity is discussed in the following.

Independently or additionally to the above, there may be considered:

For dual connectivity with one uplink carrier per cell group the UE or terminal may be allowed to and/or adapted to and/or comprise a power setting module adapted to set, and/or set, its configured maximum output power $P_{CMAX,c,x}$ and $P_{CMAX,c,y}$ on each serving cells of groups x respectively y, and its total configured maximum output power $P_{CMAX}$. The UE or terminal may be allowed to and/or adapted to and/or comprise a power setting module adapted to conform, and/or perform conforming, to any one or any one combination of the following conditions and/or prescriptions:

The total configured maximum output power $P_{CMAX}$ may or shall be set within the following bounds:

$$P_{CMAX\_L} \leq P_{CMAX} \leq P_{CMAX\_H}$$

When synchronized transmissions occur between cell groups uplink serving cells, $P_{CMAX\_L}$ and $P_{CMAX\_H}$, respectively, may be standard-defined, e.g. in subclause 6.2.5A of TS36.101 for carrier aggregation inter-band case.

It the UE or terminal is configured in Dual Connectivity in a synchronized scenario and transmissions of the UE or terminal on subframe p for any serving cell in one cell group overlap some portion of the first symbol of the transmission on subframe q+1 for a different serving cell in another cell group (where subframe p and subframe q are the subframe pairs between MCG and SCG respectively), the UE or terminal minimum of $P_{CMAX\_L}$ for subframes pairs (p, q) and (p+1, q+1) respectively applies for any overlapping portion of subframes (p, q) and (p+1, q+1). It may be considered that $P_{PowerClass}$ shall not be exceeded by the UE or terminal during any period of time.

When unsynchronized overlapping transmissions occur, the subframes in one CG that overlap with subframes in another CG in their respective slot 1 should be paired together between CGs. The terminal may be adapted for such pairing and/or comprise a corresponding pairing module. The leading CG may be taken as reference subframe i.e. whose subframe leads in time compared to the other subframe in the subframe pair. The terminal or UE may be adapted to determine the reference subframe thusly and/or comprise a corresponding referencing module. The reference subframe is the subframe where the calculated per terminal or UE $P_{CMAX}$ is applied by the UE or terminal, which may be adapted correspondingly and/or comprise a corresponding $P_{CMAX}$ applying module and/or calculating module.

If subframe p and subframe q are the subframe pairs between MCG and SCG respectively, then 1. if MCG leads, subframe p in MCG and subframes q−1 and q in SCG are considered for $P_{CMAX}$ definition i.e. for deriving the value of $P_{CMAX}$.

2. if SCG leads, subframes p and p−1 in MCG and subframe q in SCG are considered for $P_{CMAX}$ definition i.e. for deriving the value of $P_{CMAX}$.

When unsynchronized overlapping transmissions occur between two cell groups uplink serving cells, and a reference subframe p from cell group x is overlapping with 2 contiguous subframes q−1 and q on cell group y (or a reference subframe q from cell group y is overlapping with 2 contiguous subframes p−1 and p on cell group x), then the above $P_{CMAX\_L}$ and $P_{CMAX\_H}$ for the reference subframe p (or reference subframe q) duration are defined as follows:

$$P_{CMAX\_L} = \begin{cases} \text{MIN}\begin{Bmatrix} P_{CMAX\_L,x}(p), \\ P_{CMAX\_L,y}(q-1), \\ P_{CMAX\_L,y}(q), \\ P_{PowereClass} \end{Bmatrix} & \text{when } MCG \text{ leads} \\ \text{MIN}\begin{Bmatrix} P_{CMAX\_L,x}(p-1), \\ P_{CMAX\_L,x}(p), \\ P_{CMAX\_L,y}(q), \\ P_{PowereClass} \end{Bmatrix} & \text{when } SCG \text{ leads} \end{cases}$$

$$P_{CMAX\_H} = \begin{cases} \text{MIN}\begin{Bmatrix} P_{CMAX\_H,x}(p), \\ P_{CMAX\_H,y}(q-1), \\ P_{CMAX\_H,y}(q), \\ P_{PowereClass} \end{Bmatrix} & \text{when } MCG \text{ leads} \\ \text{MIN}\begin{Bmatrix} P_{CMAX\_H,x}(p-1), \\ P_{CMAX\_H,x}(p), \\ P_{CMAX\_H,y}(q), \\ P_{PowereClass} \end{Bmatrix} & \text{when } SCG \text{ leads} \end{cases}$$

$P_{CMAX\_L,x}(P)$ and $P_{CMAX\_H,x}(P)$, $P_{CMAX\_L,y}(P)$ and $P_{CMAX\_H,y}(P)$ are $P_{CMAX\_L,c}$ and $P_{CMAX\_H,c}$, respectively for $CGx$ and $CGy$, defined below:

$$P_{CMAX\_L,a}(b) = \text{MIN}\left\{10\log_{10}\sum_{c \in a} \text{MIN}\left[\frac{p_{EMAX,c \in a}}{\Delta t_{C,c \in a}}, \frac{P_{PowerClass}}{mpr_{c \in a} \cdot ampr_{c \in a} \Delta t_{C,c \in a} \cdot \Delta t_{IB,c \in a}}, \frac{P_{PowerClass}}{ampr_{c \in a}}\right], P_{PowerClass}\right\}$$

-continued and $$P_{CMAX\_H,a}(b) = \text{MIN}\left\{10\log_{10}\sum_{c\in a} p_{EMAX,c\in a}, P_{PowerClass}\right\}.$$

where $p_{EMAX,c\in a}$, $\Delta t_{C,c\in a}$, $\Delta t_{IB,c\in a}$ and the other parameters in the above equation are defined for serving cell c in CG a for subframe b.

The UE measured maximum output power $P_{UMAX,i}$ over all uplink serving cells of a cell group i may be defined if a single uplink cell is active (see e.g. subclause 6.2.5 of TS36.101).

The UE total measured maximum output power $P_{UMAX}$ for a reference subframe p (or reference subframe q) duration over all serving cells of both defined cell groups may be defined as follows:

$$P_{UMAX} = \Sigma P_{UMAX,i}$$

$$P_{CMAX\_L} - T_{LOW}(P_{CMAX\_L}) \leq P_{UMAX} \leq P_{CMAX\_H} + T_{HIGH}(P_{CMAX\_H})$$

TABLE 2

$P_{CMAX}$ tolerance for Dual Connectivity

| $P_{CMAX}$(dBm) | Tolerance $T_{LOW}(P_{CMAX\_L})$ (dB) | Tolerance $T_{HIGH}(P_{CMAX\_H})$ (dB) |
|---|---|---|
| $P_{CMAX}$ = 23 | 3.0 | 2.0 |
| [22] ≤ $P_{CMAX}$ < [23] | [5.0] | [2.0] |
| [21] ≤ $P_{CMAX}$ < [22] | [5.0] | [3.0] |
| [20] ≤ $P_{CMAX}$ < [21] | [6.0] | [4.0] |
| [16] ≤ $P_{CMAX}$ < [20] | | [5.0] |
| [11] ≤ $P_{CMAX}$ < [16] | | [6.0] |
| [−40] ≤ $P_{CMAX}$ < [11] | | [7.0] |

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminal connected to a wireless communication network and/or more than one node of a wireless communication network and/or in a wireless communication network. It may be envisioned that a node in or for communication, and/or in, of or for a wireless communication network is adapted for communication utilizing one or more RATs, in particular LTE/E-UTRA.

A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes and/or terminals of the communication. It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header. Each node or terminal involved in communication may comprise radio circuitry and/or control circuitry and/or antenna circuitry, which may be arranged to utilize and/or implement one or more than one radio access technologies. Radio circuitry of a node or terminal may generally be adapted for the transmission and/or reception of radio waves, and in particular may comprise a corresponding transmitter and/or receiver and/or transceiver, which may be connected or connectable to antenna circuitry and/or control circuitry. Control circuitry of a node or terminal may comprise a controller and/or memory arranged to be accessible for the controller for read and/or write access. The controller may be arranged to control the communication and/or the radio circuitry and/or provide additional services. Circuitry of a node or terminal, in particular control circuitry, e.g. a controller, may be programmed to provide the functionality described herein.

A corresponding program code may be stored in an associated memory and/or storage medium and/or be hard-wired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A node of a wireless communication network may be implemented as a terminal and/or user equipment and/or network node and/or base station (e.g. eNodeB) and/or relay node and/or any device generally adapted for communication in a wireless communication network, in particular cellular communication.

A wireless communication network or cellular network may comprise a network node, in particular a radio network node, which may be connected or connectable to a core network, e.g. a core network with an evolved network core, e.g. according to LTE. A network node may e.g. be a base station. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation.

A terminal may be implemented as a user equipment; it may generally be considered that a terminal is adapted to provide and/or define an end point of a wireless communication and/or for a wireless communication network. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or user equipment is adapted for one or more RATs, in particular LTE/E-UTRA.

It may be considered that a terminal or user equipment comprises radio circuitry and/or control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN. Generally, a terminal may be adapted to support dual connectivity. It may comprise two independently operable transmitter (or transceiver) circuitries and/or two independently operable receiver circuitries; for dual connectivity, it may be adapted to utilize one transmitter (and/or receiver or transceiver, if provided) for communication with a master network node and one transmitter (and/or receiver or transceiver, if provided) for communication with a secondary network node. It may be considered that a terminal comprises more than two such independently operable circuitries.

A network node or base station, e.g. an eNodeB, may be any kind of base station of a wireless and/or cellular network adapted to serve one or more terminals or user equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node.

Generally, a base station may be arranged to communicate with a core network and/or to provide services and/or control to one or more user equipments and/or to relay and/or transport communications and/or data between one or more user equipments and a core network and/or another base station. A network node or base station may generally be adapted to allocate and/or schedule time/frequency resources of a network and/or one or more cells serviced by the base station. An eNodeB (eNB) may be envisioned as an example of a base station, e.g. according to an LTE standard. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a controlling node and/or coordinating node and/or to allocate resources in particular for cellular communication via one or more than one cell.

It may be considered for cellular communication there is provided at least one uplink (UL) connection and/or channel and/or carrier and at least one downlink (DL) connection and/or channel and/or carrier, e.g. via and/or defining a cell, which may be provided by a network node, in particular a base station or eNodeB. An uplink direction may refer to a data transfer direction from a terminal to a network node, e.g. base station and/or relay station. A downlink direction may refer to a data transfer direction from a network node, e.g. base station and/or relay node, to a terminal. UL and DL may be associated to different frequency resources, e.g. carriers and/or spectral bands. A cell may comprise at least one uplink carrier and at least one downlink carrier, which may have different frequency bands.

A network node, e.g. a base station or eNodeB, may be adapted to provide and/or define and/or control one or more cells, e.g. a group of cells, which may be carrier aggregated (CA) cells. The group of cells may comprise at least one primary cell, which may be considered to be a member of the group and/or to be associated to the group. The cell group may comprise one or more secondary cells (it should be noted that every group may comprise secondary cells, not only a secondary group; the secondary in this context refers to being secondary to the primary cell of a group). A primary cell may be adapted and/or utilised for providing control information (in particular allocation data, and/or scheduling and/or allocation information regarding the primary cell and/or the group of cells to and/or from a terminal connected for communication (transmission and reception) and/or configured with the cell. The control information may pertain to the primary cell and/or the group of cells. Each primary cell and/or the associated group may be associated to a specific network node. A master network node may be adapted to provide and/or service and/or define a primary cell in a master cell group. A secondary network node may be adapted to provide and/or service and/or define a secondary cell group.

A terminal may be adapted to be configured with and/or to communicate via master cell group (at least one primary cell) for communicating with a master network node.

Additionally, a terminal may be adapted to be configured with and/or to communicate via secondary cell group (at least one (secondary) primary cell) for communicating with a secondary network node; the terminal may generally be adapted for dual connectivity. The terminal may comprise suitable circuitry, e.g. a first transmitter and/or receiver and/or transceiver circuitry (e.g., for communicating with the master network node) and a second first transmitter and/or receiver and/or transceiver circuitry (e.g., for communicating with the secondary network node/s).

A network node, in particular a base station, and/or a terminal, in particular a UE, may be adapted for communication in spectral bands (frequency bands) licensed and/or defined for LTE.

Resources or communication resources may generally be frequency and/or time resources, which may comprises e.g. frames, subframes, slots, resource blocks, carriers, subcarriers, channels, frequency/spectral bands, etc. Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. a network node or allocation node, e.g. a base station, may be adapted to determine and/or transmit corresponding allocation or scheduling data, e.g. data indicating release or de-allocation of resources and/or scheduling of UL and/or DL resources. Accordingly, resource allocation may be performed by the network and/or by a network node; a network node adapted for providing resource allocation/scheduling for one or more than one terminals may be considered to be a controlling node. Resources may be allocated and/or scheduled on a cell level and/or by a network node servicing and/or providing the cell.

Allocation data may be considered to be data indicating and/or granting resources allocated by a network node, e.g. a controlling and/or allocation node, in particular data identifying or indicating which resources are reserved or allocated, e.g. for cellular communication, which may generally comprise transmitting and/or receiving data and/or signals; the allocation data may indicate a resource grant or release and/or resource scheduling. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE. In particular, allocation data may comprise information and/or instructions to reserve resources or to release resources, which may already be allocated. A terminal may generally be adapted to perform transmission of data to, e.g. UL data, and/or reception of data from, a network node and/or to more than one network nodes, according to allocation data.

Figure 5:
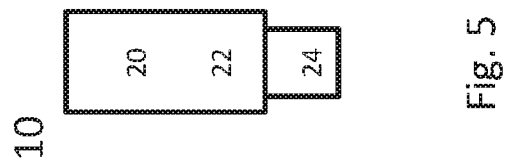
FIG. 5 shows an exemplary terminal.

There is described a method for operating a wireless device, e.g. a user equipment, The method comprising FIG. 5 schematically shows a terminal 10, which may be implemented in this example as a user equipment. Terminal 10 comprises control circuitry 20, which may comprise a controller connected to a memory. A receiving module and/or transmitting module and/or control or processing module and/or CIS receiving module and/or scheduling module, may be implemented in and/or executable by, the control circuitry 20, in particular as module in the controller. Terminal 10 also comprises radio circuitry 22 providing receiving and transmitting or transceiving functionality, the radio circuitry 22 connected or connectable to the control circuitry. An antenna circuitry 24 of the terminal 10 is connected or connectable to the radio circuitry 22 to collect or send and/or amplify signals. Radio circuitry 22 and the control circuitry 20 controlling it are configured for cellular communication with a network on a first cell/carrier and a second cell/carrier, in particular utilizing E-UTRAN/LTE resources as described herein. The terminal 10 may be adapted to carry out any of the methods for operating a terminal disclosed herein; in particular, it may comprise corresponding circuitry, e.g. control circuitry.

FIG. 6 schematically show a network node or base station 100, which in particular may be an eNodeB, for example a MeNB or SeNB. Network node 100 comprises control circuitry 120, which may comprise a controller connected to a memory. A receiving module and/or transmitting module and/or control or processing module and/or scheduling module and/or CIS receiving module, may be implemented in and/or executable by the control circuitry 120. The control circuitry is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry.

Figure 7:
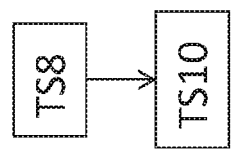
FIG. 7 shows an example of a method for operating a terminal.

FIG. 7 shows an exemplary flowchart of a method for operating a terminal, which may be a terminal as described herein, in particular a terminal configured for and/or in dual connectivity. The method may comprise an optional action TS8 of obtaining synchronization information, the synchronization information referring to the synchronization level. The method may further comprise an action TS10 of determining a configured transmitted (or output) power, $P_{CMAX}$, of the terminal based on the synchronization level.

Figure 8:
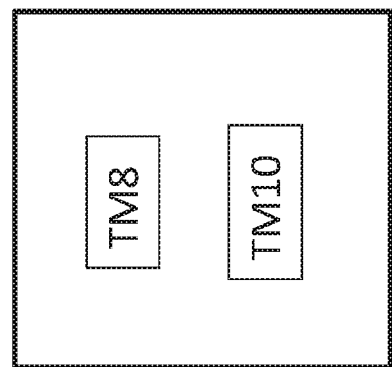
FIG. 8 shows an example of a terminal.

FIG. 8 shows an example for a terminal, which may be a terminal as described herein, in particular a terminal configured for and/or in dual connectivity. The terminal may comprise an optional obtaining module TM8 for performing action TS8. The terminal may further comprise a determining module TM10 for performing action TS10.

Figure 9:
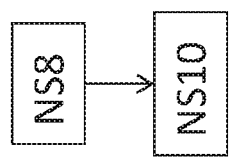
FIG. 9 shows an example of a method for operating a network node.

FIG. 9 shows an exemplary flowchart of a method for operating a network node, which may be a network node as described herein, in particular a network node configured for and/or in dual connectivity with a terminal. The method may comprise an action NS10 of obtaining synchronization information regarding the time difference between signals from a master cell group, MCG, and a secondary cell group, SCG, the terminal is configured with. Optionally, the method may comprise an action NS12 of transmitting the obtained synchronization information to the terminal.

Figure 10:
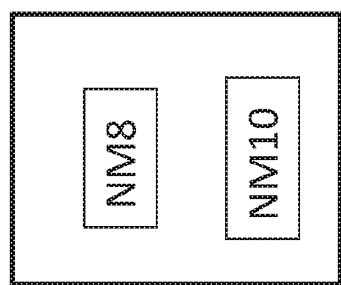
FIG. 10 shows an example of a network node.

FIG. 10 shows an example of a network node, which may be a network node as described herein, in particular a network node configured or configurable for and/or in dual connectivity with a terminal. The network node may comprise an obtaining module for performing action NM10 of obtaining synchronization information regarding the time difference between signals from a master cell group, MCG, and a secondary cell group, SCG, the terminal is configured with. Optionally, the network node may comprise a transmitting module for performing an action NM12 of transmitting the obtained synchronization information to the terminal.

There may be considered a network node adapted for performing any one of the methods for operating a network node described herein.

There may be considered a terminal adapted for performing any one of the methods for operating a terminal described herein.

There is also disclosed a program product comprising code executable by control circuitry, the code causing the control circuitry to carry out and/or control any one of the method for operating a terminal or network node as described herein, in particular if executed on control circuitry, which may be control circuitry of a terminal or a network node as described herein.

Moreover, there is disclosed a carrier medium carrying and/or storing at least any one of the program products described herein and/or code executable by control circuitry, the code causing the control circuitry to perform and/or control at least any one of the methods described herein. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A cell group may alternatively be referred to as carrier group, in particular due to each cell comprising one or more carriers (a carrier in this context may refer to a carrier frequency and/or band for wireless transmission, in particular according to a telecommunication standard like LTE.

A terminal and/or network node may be adapted, and/or comprise a connectivity module for, supporting dual connectivity. For example, a terminal, and/or its connectivity module, may be adapted to communicate, in particular to transmit and/or receive control and/or scheduling and/or allocation data, with more than one network node, one of which may be a master network node and at least one other node may be a secondary node.

A master network node, and/or its connectivity module, may be adapted to control functionality of a secondary network node in dual connectivity, in particular handover between secondary network node; the master network node, and/or its connectivity module, may be adapted to transmit and/or receive corresponding control signaling to the secondary network node, e.g. via a backhaul and/or communication interface, e.g. a X2 interface.

A network node may generally comprise a corresponding backhaul and/or communication interface. It may be considered that the backhaul may be non-ideal, i.e. it may have high latency (high latency may be latency which is too high to perform real-time control and/or to provide synchronized scheduling and/or allocating of resource by the master network node for the communication between the secondary network node and the terminal; alternatively or additionally, high latency may be latency higher than a predetermined high latency threshold value, which may be dependent on the implemented system and/or standard, e.g. LTE). Alternatively, it may be considered that the backhaul is ideal, allowing (in principle) such kind real-time control. A secondary network node, and/or its connectivity module, may be adapted to receive control information from a master network node. A master network node may generally be adapted for secondary network node functionality, e.g. for another terminal, and vice versa.

A terminal being configured with a cell and/or carrier, and/or being connected to a network node via a cell, may be in a state in which it may communicate (transmit and/or receive data, e.g. with the network node) using the cell or carrier, e.g. being registered with the network for communication and/or being synchronized to the cell and/or carrier; in particular, the cell may be activated for the terminal.

A terminal may be adapted to perform an activation procedure, in which it activates a cell based on a timing message and/or timing parameter received from a network node providing and/or servicing and/or defining and/or scheduling the cell. The activation procedure may be part of an access procedure, in particular a random access procedure.

An access procedure/request may generally be a random access procedure as described herein, e.g. with contention resolution or contention-free. It may be performed between a terminal and/or network node to access and/or time align and/or activate a cell, for the terminal, the cell being provided and/or serviced and/or defined and/or controlled by and/or associated to the network node.

An activation procedure may comprise an access procedure. It should be noted that the result of a performed access or activation procedure may be a failure, if the terminal was not able to activate the cell, e.g. due to unfavorable reception conditions.

Synchronization information may generally refer to information regarding the time difference between signals from the master network node, e.g. via the MCG, and the secondary network node, e.g. via the SCG, and/or to the time difference between signals received, by the terminal, via the MCG and the SCG, in particular via the respective primary cells (PCell and PSCell). Synchronization information may refer to and/or comprise a synchronization level. A synchronization level may indicate whether the time difference (or its absolute value) lies above a given threshold and/or between given thresholds, e.g. if it is larger than a threshold defining the signals of being synchronized. Generally, a synchronization level may indicate a pre-defined type or mode of synchronization in dual connectivity, as discussed herein. One or more thresholds may be defined as above in terms of types of synchronization. Synchronization information may additionally or alternatively comprise the value and/or absolute value of the time difference. An example of a synchronization level includes synchronized and unsynchronized (also referred to as synchronous and asynchronous).

Configuring a terminal or UE, by a network or network node, may comprise transmitting, by the network or network node, one or more parameters and/or commands to the terminal or UE, and/or the terminal or UE changing it configuration and/or setup based on received parameters and/or commands from the network and/or the network node.

Some useful abbreviations comprise:
Abbreviation Explanation
CCA Clear Channel Assessment
DCI Downlink Control Information
DL Downlink
DMRS Demodulation Reference Signals
eNB evolved NodeB, base station
TTI Transmission-Time Interval
UE User Equipment
UL Uplink
LA Licensed Assisted
LA Licensed Assisted Access
DRS Discovery Reference Signal
SCell Secondary Cell
SRS Sounding Reference Signal
LBT Listen-before-talk
PCFICH Physical Control Format Indicator Channel
PDCCH Physical Downlink Control Channel
PUSCH Physical Uplink Shared Channel
PUCCH Physical Uplink Control Channel RRM Radio Resource Management
CIS Transmission Confirmation Signal
3GPP 3$^{rd}$ Generation Partnership Project
Ack/Nack Acknowledgment/Non-Acknowledgement, also A/N
AP Access point
B1, B2, . . . Bn Bandwidth of signals, in particular carrier bandwidth Bn assigned to corresponding carrier or frequency f1, f2, . . . , fn
BER/BLER Bit Error Rate, BLock Error Rate;
BS Base Station
CA Carrier Aggregation
CC component carrier (a carrier in a carrier aggregate)
CoMP Coordinated Multiple Point Transmission and Reception
CQI Channel Quality Information
CRS Cell-specific Reference Signal
CSI Channel State Information
CSI-RS CSI reference signal
D2D Device-to-device
DL Downlink
EPDCCH Enhanced Physical DL Control CHannel
DL Downlink; generally referring to transmission of data to a node/into a direction further away from network core (physically and/or logically); in particular from a base station or eNodeB to a D2D enabled node or UE; often uses specified spectrum/bandwidth different from UL (e.g. LTE)
eNB evolved NodeB; a form of base station, also called eNodeB
E-UTRA/N Evolved UMTS Terrestrial Radio Access/Network, an example of a RAT
f1, f2, f3, . . . , fn carriers/carrier frequencies; different numbers may indicate that the referenced carriers/frequencies are different
f1_UL, . . . , fn_UL Carrier for Uplink/in Uplink frequency or band
f1_DL, . . . , fn_DL Carrier for Downlink/in Downlink frequency or band
FDD Frequency Division Duplexing
ID Identity
L1 Layer 1
L2 Layer 2
LTE Long Term Evolution, a telecommunications standard
MAC Medium Access Control
MBSFN Multiple Broadcast Single Frequency Network
MDT Minimisation of Drive Test
MME Mobility Management Entity; a control entity of a wireless communication network (LTE) providing control functionality e.g. for radio network nodes like eNBs
NW Network
OFDM Orthogonal Frequency Division Multiplexing
O&M Operational and Maintenance
OSS Operational Support Systems
PC Power Control
PCell Primary Cell (e.g. in CA, in particular a primary cell of a Master Cell Group)
PDCCH Physical DL Control CHannel
PH Power Headroom
PHR Power Headroom Report
Pscell primary cell of a secondary cell group
PSS Primary Synchronization Signal
PUSCH Physical Uplink Shared CHannel
R1, R2, . . . , Rn Resources, in particular time-frequency resources, in particular assigned to corresponding carrier f1, f2, . . . , fn
RA Random Access
RACH Random Access Channel
RAN Radio Access Network
RAT Radio Access Technology
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related
SA Scheduling Assignment
SCell Secondary Cell (e.g. in CA)
SINR/SNR Signal-to-Noise-and-Interference Ratio; Signal-to-Noise Ratio
SFN Single Frequency Network
SON Self Organizing Network
SSS Secondary Synchronization Signal
TPC Transmit Power Control
TX transmission/transmitter, transmission-related
TDD Time Division Duplexing
UE User Equipment
UL Uplink; generally referring to transmission of data to a node/into a direction closer to a network core (physically and/or logically); in particular from a D2D enabled node or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency
DC Dual Connectivity
MCG Main Cell Group
SCG Secondary Cell Group
PCell Primary Cell
PSCell Primary SCell
SCell Secondary Cell
RACH Random Access CHannel These and other abbreviations may be used according to LTE standard definitions

The invention claimed is:

1. A method for operating a terminal in a wireless communication network, the terminal being adapted for dual connectivity and the terminal being connected to a master network node via a master cell group (MCG) and to a secondary network node via a secondary cell group (SCG), the method comprising:
determining a total configured maximum output power of the terminal based on a synchronization level;
wherein, in response to determining that a subframe p of the MCG overlaps with a subframe q of the SCG such that the first slot of subframe p overlaps with the first slot of subframe q, and subframe p leads in time compared to the subframe q, subframe p of the MCG is defined as a reference subframe, and the total configured maximum output power for the reference subframe is determined considering subframes q and q-1 of the SCG.

2. The method of claim 1, wherein the method comprises obtaining synchronization information, the synchronization information referring to the synchronization level.

3. The method of claim 1, wherein subframes in the MCG overlapping with subframes in the SCG in their respective slot 1 are paired together for determining total configured maximum output power.

4. The method of claim 1, wherein a subframe of overlapping subframes of the MCG and SCG leading in time compared to the other subframe in a subframe pair is defined as reference subframe.

5. The method of claim 1, further comprising transmitting an uplink signal according to the determined total configured maximum output power of the terminal.

6. A terminal for a wireless communication network, the terminal being adapted for dual connectivity and adapted to be connected to a master network node via a master cell group (MCG) and to a secondary network node via a secondary cell group (SCG), the terminal comprising:
   radio circuitry, and
   controller circuitry operatively coupled to the radio circuitry and configured to determine a total configured maximum output power of the terminal based on a synchronization level;
wherein the terminal is further configured to, in response to determining that a subframe p of the MCG overlaps with a subframe q of the SCG such that the first slot of subframe p overlaps with the first slot of subframe q, and subframe p leads in time compared to the subframe q, define subframe p of the MCG as a reference subframe and determine the total configured maximum output power for the reference subframe in consideration of subframes q and q-1 of the SCG.

7. The terminal of claim 6, the controller circuitry being further configured to obtain synchronization information, the synchronization information referring to the synchronization level.

8. The terminal of claim 6, wherein subframes in the MCG overlapping with subframes in the SCG in their respective slot 1 are paired together for determining the total configured maximum output power.

9. The terminal of claim 6, wherein a subframe of overlapping subframes of the MCG and SCG leading in time compared to the other subframe in a subframe pair is defined as reference subframe.

10. The terminal of claim 6, wherein the controller circuitry is configured to control the radio circuitry to transmit an uplink signal according to the determined total configured maximum output power of the terminal.

11. A method for operating a network node, the network node being in dual connectivity with a terminal, the method comprising obtaining, by the network node, synchronization information regarding the time difference between signals from a master cell group (MCG) and a secondary cell group (SCG) the terminal is configured with.

12. The method of claim 11, the method further comprising transmitting the obtained synchronization information to the terminal.

13. A network node, the network node being configured for dual connectivity with a terminal, the network node comprising:
   radio circuitry, and
   controller circuitry operative coupled to the radio circuitry and configured to obtain synchronization information regarding the time difference between signals from a master cell group (MCG) and a secondary cell group (SCG) the terminal is configured with.

\* \* \* \* \*